Feb. 7, 1939.  J. V. RICE, JR  2,145,891
ANTISHOCK SPRING
Original Filed Jan. 28, 1936  4 Sheets-Sheet 1
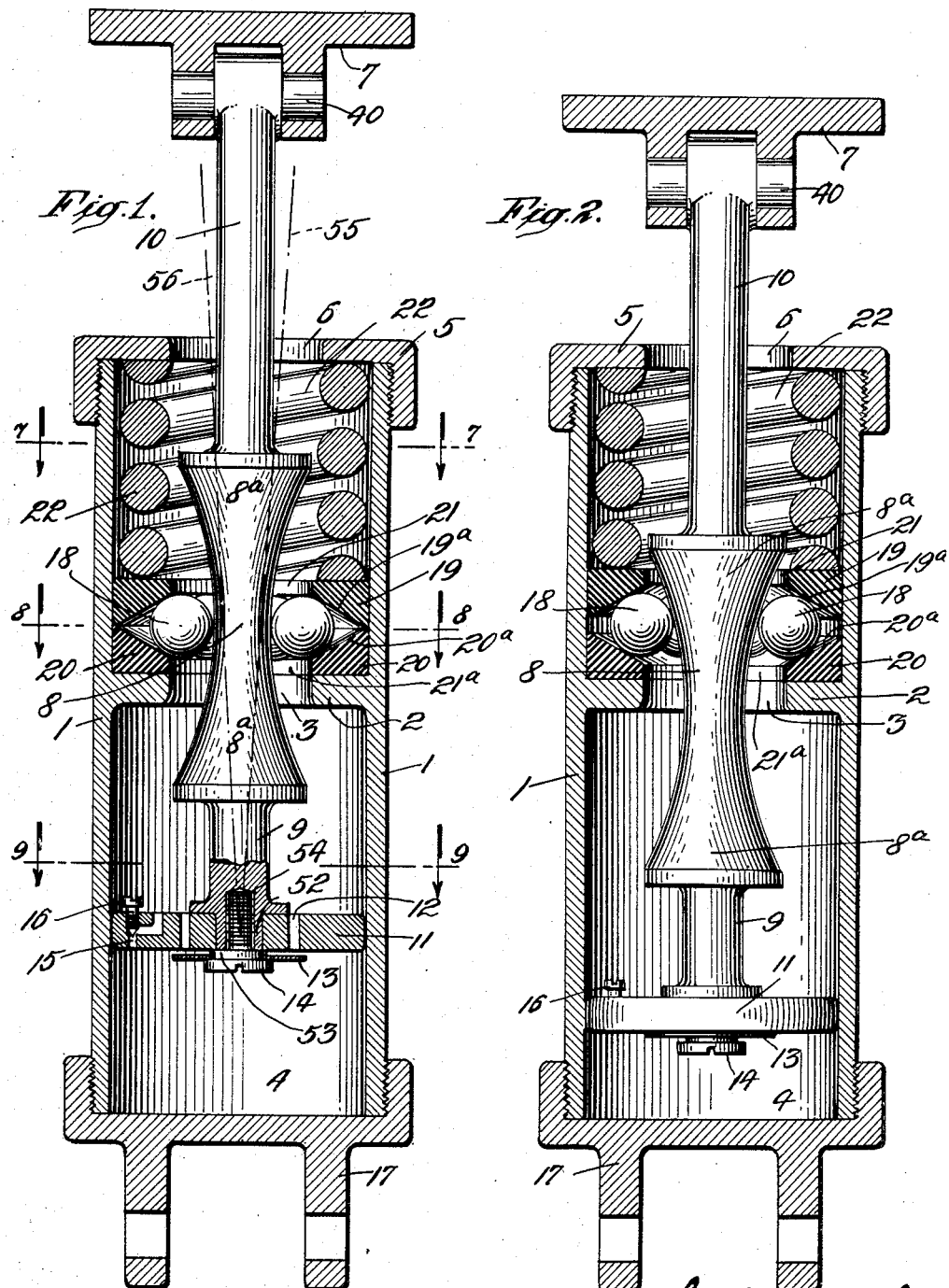

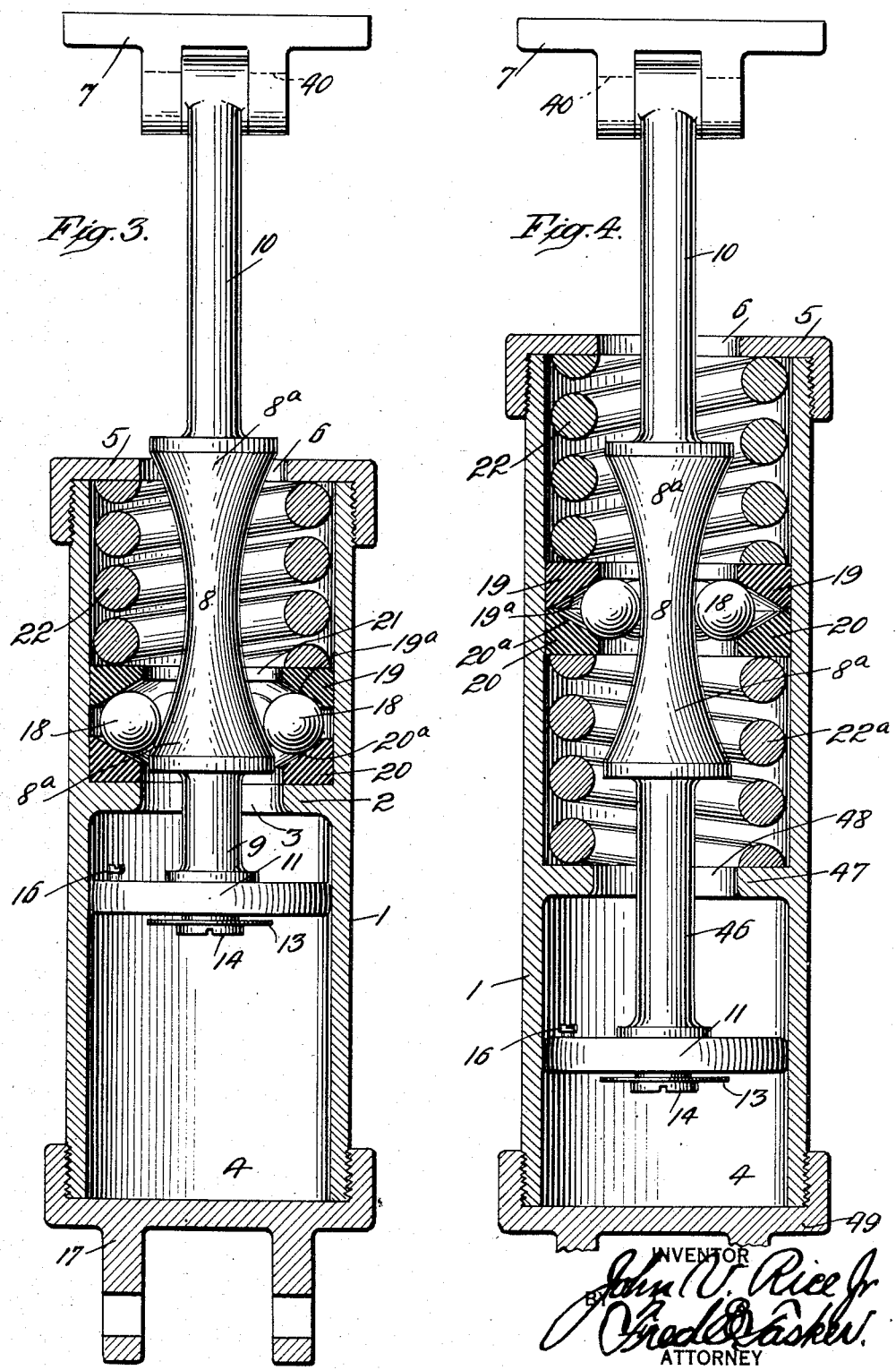

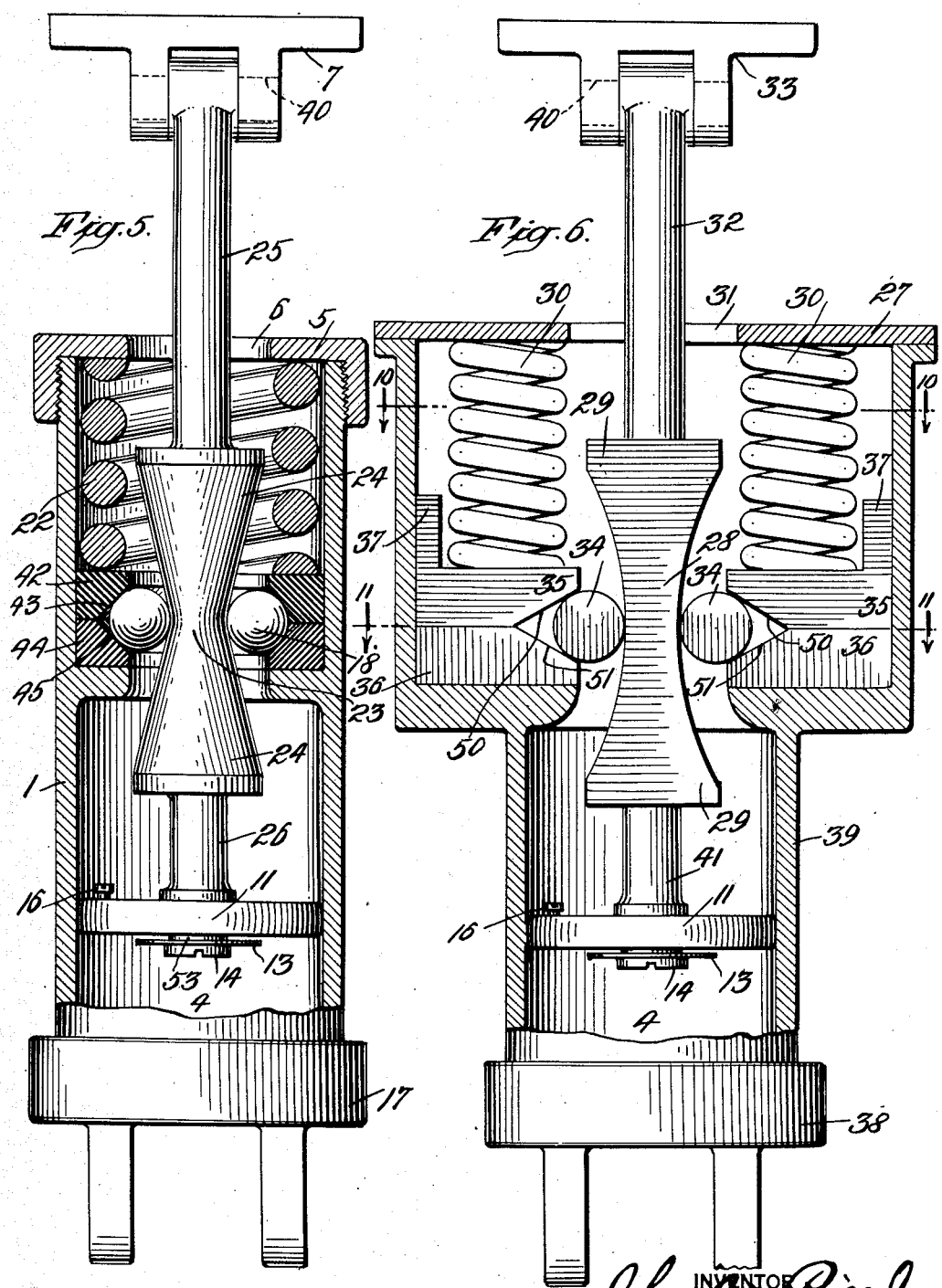

Feb. 7, 1939. J. V. RICE, JR 2,145,891
ANTISHOCK SPRING
Original Filed Jan. 28, 1936 4 Sheets-Sheet 4
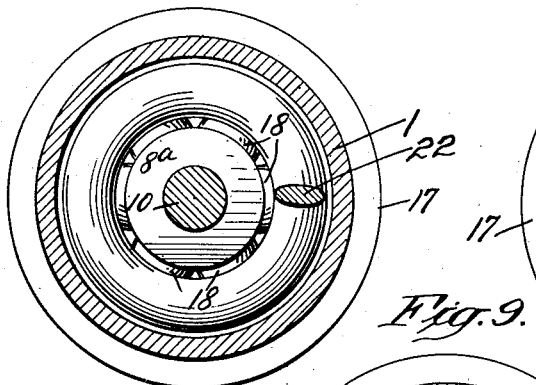
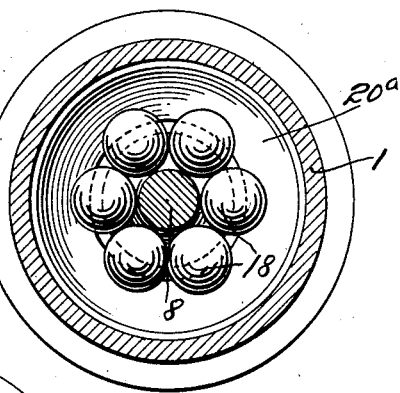
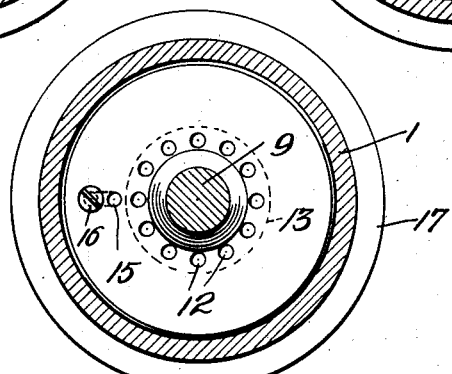
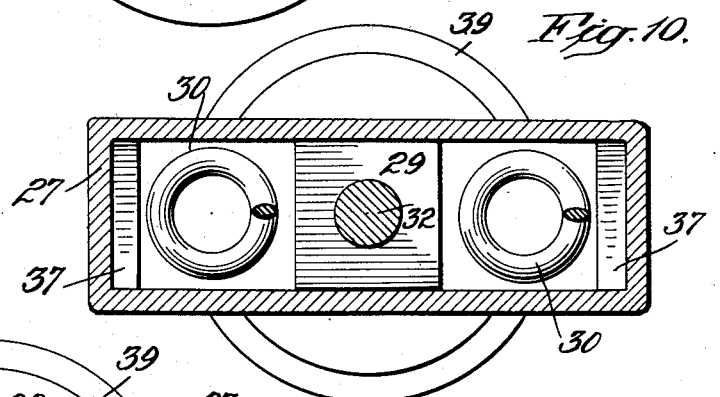
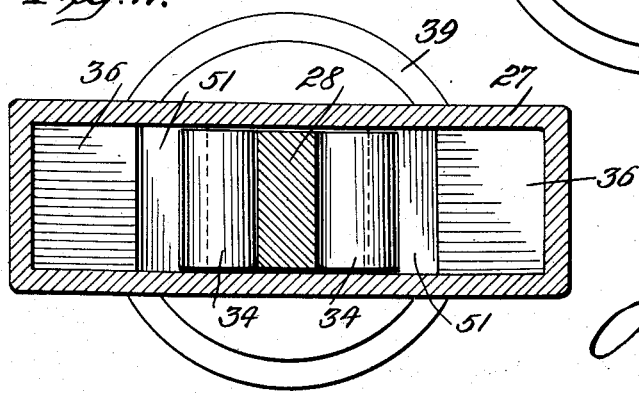

Patented Feb. 7, 1939

2,145,891

UNITED STATES PATENT OFFICE 2,145,891

ANTISHOCK SPRING

John V. Rice, Jr., Philadelphia, Pa.

Application January 28, 1936, Serial No. 61,199
Renewed April 30, 1938

10 Claims. (Cl. 267—34)

This invention relates to a yielding or elastic spring device for taking up and absorbing the shocks and jars incidental to the operation of such machines as automobiles and aircraft, wherein a supported body of considerable weight is transported with great speed sometimes over irregular surfaces, or is brought rapidly to earth in landings from the air, it being essential to make the running and the stops with as little agitation and jar as possible.

Wider aspects of the invention not only make it applicable to accomplish the safe and easy transport of passengers in rapid heavy conveyances, but also to the absorption of lighter shocks, as occur in door-springs and checks, and similar small mechanisms, operable with quick rebounds that would be apt to injure the parts if the shock were not elastically counteracted.

Another large field of usefulness for the invention is found in buffers, slack-compensators and draw-heads of railway cars of all kinds, as well as with trackless trolleys and heavy motorbusses, where it is essential that the coupling and bumping together of car units should be shielded from too great crashes or shocks and made easy on the machines, and the passengers, and merchandise carried.

With these few suggested leading objects of the invention, to which numerous others may be added as the pronounced usefulness of the invention is recognized in various branches of mechanisms, it may be said that the invention consists essentially in the construction, arrangement and combination of parts, substantially as will be hereinafter described and claimed.

In the accompanying drawings illustrating my invention:

Figure 1 is a vertical section of a leading specimen of my improved anti-shock spring.

Figure 2 is a similar vertical section showing the parts in another relative position which they assume in their operation.

Figure 3 is another similar section showing the parts in a still further change of relative position in the operation of the device.

Figure 4 is a vertical section of a modified form of the invention, showing the use of two springs, instead of one, as in Figures 1, 2 and 3.

Figure 5 is a similar vertical section, showing the beveled rings that form the raceways for the balls cut at a different angle from that used in the form of the device in Figures 1 to 4.

Figure 6 is a vertical section showing the anti-shock mechanism arranged to utilize roller instead of ball bearings, and indicating a dual spring pressure mechanism.

Figure 7 is a horizontal section on the line 7, 7, of Figure 1.

Figure 8 is a horizontal sectoin on the line 8, 8, of Figure 1.

Figure 9 is a horizontal section on the line 9, 9, of Figure 1.

Figure 10 is a horizontal section on the line 10, 10, of Figure 6.

Figure 11 is a horizontal secsstion on the line 11, 11, of Figure 6.

Similar characters of reference denote like parts throughout all the different figures of the drawings.

In explaining the chief features of my improved anti-shock spring, its details, and their relation to each other and their operation, I have chosen to illustrate the same primarily in the form of a shock-absorber for automobiles, giving this as one important specimen or example of the invention, but without intending to limit the same to this use. In any shock absorber, as is well-known, an elastic or shock resisting means is interposed between the axle or running gear of the car and the chassis or body, so that the jar or vibration of the running gear or its oscillation and the shocks due to a rough or uneven roadway, may not be communicated to the car but may be absorbed or eliminated through and in the interposed elastic or flexible connections.

In Figures 1, 2 and 3, I have delineated one form of this shock absorber. I denotes an elongated cylinder or casing of greater or less length and diameter, according to the dimensions appropriate to the particular use in view; and at a suitable point therein, say midway or thereabouts, is an integral horizontal inner ledge or shelf 2, having a central circular opening 3.

The upper end of the cylinder 1 is covered with a screw cap 5 having a central opening 6 therein; and the lower end of cylinder 1 is closed by a screw cap 17, having a suitable bracket or other outer construction to enable it to be securely bolted or fastened to the axle or some other part of the running gear of an automobile, if the case is that of a shock-absorber. Thus the lower end of my spring device is rigidly affixed to the axle, while the upper end by means of a member which projects from the interior of cylnder 1 through top opening 6 is connected to a casting 7 or other suitable part on the car body, and in this way the spring or elastic medium is established between the car body and the lower running gear, so as to prevent shock and serious vibration from being communicated to the car body. That is to say, there is one element rigidly attached to the casing, there is also a second element, and flexible means in the casing is interposed between the two elements, so that shocks originating in one element are absorbed in the flexible means and not communicated to the other element.

In the interior of the cylinder 1, as in a casing, is arranged the mechanism which makes the device resilient, and which includes a spring or springs, ball bearings, raceways therefor, and a vertically-travelling double-conical spool or its equivalent which acts to move the balls sidewise and thus spread the raceway rings apart and compress the spring in an easy and gentle manner which makes the whole device elastic and yielding in any desired degree, and capable of handling any load with a powerful elastic effect.

Studying this interior mechanism I mention the spiral or helical spring 22 which lies between the inside face of cap 5 and the upper ring 19 having beveled face 19a and central opening 21. Ring 19 lies on ring 20 having beveled face 20a and central opening 21a, which face 20a is opposite to beveled face 19a, and the latter ring 20 rests on the shelf or ledge 2. Thus the two rings and their beveled faces 19a and 20a constitute a raceway for a series of balls 18 that lie partly between the bevel or inclined faces 19a and 20a, in a circular series, and these balls are capable of being forced against the bevel faces, farther and farther in, the result of which movement of balls 18 is to separate the rings 19 and 20 from each other. In Figure 1 the rings 19 and 20 are in contact with each other; in Figures 2 and 3 they are separated from each other. Of course, since the ring 20 rests on ledge 2, which resists any movement on the part of ring 20, the ring 19 is the one that moves, and it moves upwardly corresponding to the inner horizontal travel of the balls 18, and the upward movement of ring 19 compresses the spring 22 to a greater or less extent, so that we here have forces acting and reacting, the balls acting to spread the rings and compress the spring, and the tension of the spring acting to resist the opening of the rings from each other and tending to force them together and drive the balls back.

The agency which thus moves the balls 18 against the bevel faces of the rings, is a vertically-traveling double conical spool, whose middle section 8 is the smallest in diameter, while its end sections 8a are larger in size and diameter and spread out gradually into cones with curved or straight sides, the bases of the cones being the ends of members 8a. When the device is normally at rest, as in Figure 1, with the rings 19 and 20 in contact with each other, the balls 18 will be in contact with a less portion of faces 19a and 20a than at any other time, and at this time the balls will be also closely against the central narrow part 8 of the conical spool, it being noted that the balls are always in close, constant contact with some part of this actuating spool. The spool is now held by the balls in its central neutral or normal position, in which case the top conical part 8a lies within the spring 22, while the lower conical part 8a projects down through the opening 3 in ledge 2 into lower oil or air chamber 4.

The spool carries at its upper end an integral rod 10, the end of which has thereon pins or journals 40 that enter openings in casting 7, so that there may be some sort of a loose or pivoted connection between the rod 10 and the supported car body, which connection may vary within very wide limits. The lower end of the conical spool has a downwardly projecting stem 9, the function of which I shall presently explain.

In Figure 1 the parts are in their normal position, the spring 22 being of such strength as will uphold a normal weight when the movement of the car is even and regular, without any special shocks that require eliminations through spring compression and expansion. In Figure 2 the weight or shock in the car body is such as to depress the rod 10 and the spool to such an extent that the central narrow part 8 of the spool drops below the balls 18 and the upper wider conical section 8a is forced down between the balls, thus causing them to ride on the curved outer conical wall of upper member 8a, which forces the balls sidewise horizontally, farther and farther between the bevel faces 19a and 20a, in proportion to the power exerted at the movement on the spool to depress the same and drive the balls between the rings, whereby the ring 19 is lifted and spring 22 is compressed. When the shock is thus absorbed by the action of the spring the parts will pass from the position taken in Figure 2 to the former neutral position indicated in Figure 1, for when the compressed spring is released from its compression the ring 19 is again pressed back against its companion 20 and the balls 18 fall back against the middle section 8 of the spool as the latter rises and the upper cone 8a releases its contact with the balls.

Again, in Figure 3, the reverse action obtains, for there the parts are changed in position by another kind of shock which lifts the car body or the supported weight, and in order that such a jar may be absorbed or relieved the spool rises so that its lower cone 8a instead of its upper cone 8a, is the agent for forcing the balls between the bevel faces of the rings and separating the rings and compressing the spring 22, so that the impact of the load on the spring may be absorbed without jar or any disturbing recoil. The action therefore of both the conical members of the spool on the ball bearings, the bevel rings and the spring, is exactly the same in both cases; as is clearly seen by comparing the position of the parts in Figure 2 with their position in Figure 2, the device being thus double acting.

I have shown the faces of the conical members 8a of the spool, as curved from the bases of the respective cones to the narrow connecting part 8 at the center, as these faces are represented in Figures 1, 2, 3, and 4; but it is not essential that the surfaces that act against the balls should be thus curved to secure good results. They may be straight as shown at 24, 24, in Figure 5, in which case the action against the balls will be less gradual and more direct and positive and the neck 23 will be more acute and in some cases the straight lines may produce quicker and better results. Also the configuration may be changed to other forms than these in exceptional instances for special reasons and results.

In Figure 4, I show the use of two springs 22 and 22a instead of one. In this example the shelf 2 is omitted and the two rings 19 and 20 are together supported between the two springs, the spring 22 bearing against ring 19, and the spring 22a bearing against the ring 20, so that the two rings bear against each other. In this modification the ledge 47 is preferably lower down in cylinder 1 than the ledge 2 in Figure 1, and the lower spring 22a rests on ledge 47 with its bottom part surrounding the opening 48, through which projects the bottom stem 46, and the bottom chamber 4 may obviously be somewhat smaller, although its size and proportions may always vary greatly.

Obviously the angle of the bevel or inclination of the faces of the rings may vary greatly with a corresponding change in the action of the balls against these faces. Thus the faces 19a and 20a, in Figures 1, 2, 3, and 4 are cut at an angle of about, say, 30 degrees to the horizontal; while in Figure 5 the faces 43 and 45 of rings 42 and 44 are cut to an angle of, say, 45 degrees; but these inclinations may be changed as desired and others substituted for them, and the results in the differences in the elastic action of the device may readily be calculated and may be adjusted to the solution of many different problems in shock elimination arising from the character of the vehicle, the load, the roadway, speed, traffic conditions, and other collateral conditions.

The rolling devices that act to spread the beveled rings may be balls that are completely spherical, as shown in Figure 8, or they may be substantially round or spherical, or they may be in the form of rollers, of greater or less length and diameter, an example of which is shown at 34 in Figure 6. The alternative specimen in this Figure employs a box 27 in lieu of the cylinder 1, which box is wide in one direction and narrow in another and is integral with a cylindrical extension 39 that contains the chamber 4. The box 27 has a central top opening 31, through which projects the rod 32, whose upper end has journals 40 entering the casting 33 attached to the body of a vehicle or conveyance. Within the box 27 and resting on the bottom thereof is a pair of lower plates or blocks 35 and 36, each being spaced from its companion a short distance to leave an opening, above the opening into the upper end of the cylindrical extension 39, as shown in Figures 6 and 11, the lower plates being plates 36 which have inclined faces 51, and the upper plates being plates 35 which have inclined faces 50 lying opposite to faces 51 so that in the wedges or V-spaces formed by these faces the rollers 34 may lie and travel laterally to open the wedges and separate the plates when the spool device acts against said rollers. Further the upper plates 35 are formed at the end with upward projections 37 that lie against the inner ends of the box and slide thereon as guides when the blocks or plates 35 are lifted. Springs 30 are tensioned between the blocks or plates 35 and the inner top side of box 27 to hold the said blocks 35 closely on top of blocks 36, and the tension of springs 30 is overcome when the rollers are forced laterally farther and farther into the wedging openings so as to lift the top blocks 35 off the lower blocks 36. The spool device in this modified form of my invention is preferably of a generally rectangular form, two sides being flat and parallel, while the other two sides are curved to be in actuating contact with the rollers. Thus the middle portion 28 of the spool device is the smallest in cross-section while the larger and heavier end members 29 have square bases, as in Figure 10, and have the pair of curved sides that act against the rollers in the same way that the curved-side conical members 8a act against the balls 18 in the other form of the invention already described. This rectangular spool device has a vertical travel in the operation of the mechanism for preventing shocks and acts to separate the blocks more or less and compress the springs, the tension of which expands them again as soon as conditions change in a cycle or routine of actions quite similar to the operation of the spool and balls in the form of ball mechanism already described.

The different forms of the spool device not only have an upwardly extending rod, as 10, or 25, or 32, which is fastened to the car body, or other upper element, but also they have at the lower end a downwardly extending stem or rod, as 9, or 26, or 46, or 41. This bottom stem is secured to a piston 11, preferably of a thin type, which fits into the inside of the cylinder 1 and is designed to travel up and down in the chamber 4, that is filled as full as may be desired with oil, air, or other fluid or liquid. The connection of stem 9 with piston 11 may be made in any convenient way; as for example by forming a reduced and shouldered end 52 on stem 9 which will fit into a central opening in piston 11. The piston 11 has a threaded opening therein which is engaged by the shank 54 of a headed screw 14, on which is a shoulder 53 which fits closely against the under side of piston 11 when the screw 14 is tightly screwed into end 52 of stem 9, whereby the piston 11 is securely fastened to stem 9 and travels up and down in chamber 4 as the spool is actuated up and down. On the shoulder 53 is a valve plate 13 having a central opening that receives the shoulder 53, and this valve is loose enough on the shoulder to allow it a range of movement relative to the piston as the piston moves up or down, this movement being towards and away from the opposite surface of the piston 11, in which is a series of orifices or openings 12 that pass through the width of piston 11 and allow oil to pass or repass, accordingly as the openings 12 are opened or closed by the valve plate 13. When the piston rises the valve 13 obviously drops and opens passages 12 so that oil or other liquid or fluid may pass down through said openings from the chamber above the piston 11 to the chamber below it. When the piston 11 descends, the valve 11 being in contact with the liquid or pressure beneath it, will rise and close the passages 12 so that the oil or pressure beneath will not rise up through the piston to the space above it.

In order to better regulate the flow through the piston and control and adjust the same I provide the piston 11 with an additional angular by-pass passage 15, in which is a small screw valve 16, having an inner valve point which works as a valve seat, so that a delicate adjustment is possible, and a certain amount of oil or pressure, more or less, is allowed to pass even when the main valve 13 is closed, this regulation by the use of an additional auxiliary valve being quite essential to the most efficient operation of the device.

Therefore, the chamber 4, which is really divided into two spaces by the piston 11, acting as a diaphragm, is provided with a quantity of oil, or lubricant, or some other liquid or fluid, even air at times serving the purpose. This liquid or fluid passes through the piston as stated and occupies the spaces above and below the piston, and splashes as a lubricant upward through the opening 3, so as to lubricat the spring, the rings and the ball or roller bearings, to promote the smooth and easy operation of all the parts. Also such a volume of fluid or liquid pressure stabilizes the movement of the device and enables the operation to be quicker and smoother.

Attention must particularly be called to the function of this device in taking care of lateral strains and shocks as well as vertical movements. At many times the effect of a shock is to produce an up and down vertical movement of the spool, so that it travels in a line along the central axis of the cylinder 1, for example. There are however a vast number of strains, such as many road shocks in the running of an automobile, particularly in rapidly rounding a corner, or in quick deviations from a straight course, where there is a severe shock as the car swerves over to one side or the other. This causes the spool to deflect from its normal position to one side or the other, as shown by the inclined dotted lines 55 and 56 in Figure 1, said lines running down to the center of screw 54 or the center of the piston 11, which partakes but slightly of such a movement, being tipped only a little up or down from its horizontal position. Such slight change of level of piston 11 as does occur is provided for by having the outer periphery of piston 11 slightly rounded, as shown. Now the yielding support of the spool in the spring and ball or roller bearing permits the side deflection to occur in this lateral movement, and there is a powerful elastic resistance to such a movement caused by the relation of the parts. The fact that my combination of spring, spool, and ball bearing makes it possible to withstand and absorb lateral strain and shocks as well as direct vertical shocks is a most important feature of my invention.

From the foregoing complete description of the construction and operation of the details of mechanism, the full function of every part, and the effect of the operation in attaining the desirable results sought after, will be evident to all skilled in the art without the necessity of much additional explanation. Almost any weight of vehicle may be taken care of and the oscillation and shocks absorbed if a spring is used that is strong enough to do the work. The spring tensioned against the ball bearing rings and balls is hence a most important feature in the combination. The relative sizes and proportions of all the mechanical features can be calculated to meet the requirements of any size of load, large or small.

Further, the readjustment of the details may be necessary to adapt the device for use in counteracting shock or vibration in various other combinations, such as door checks, buffers, bumpers, car drawbars, drawheads, and a great variety of other devices, where it is necessary to utilize resilient or elastic means to perfect the smooth operation or running of the same, must all be included within the scope of the idea underlying my invention. I therefore claim the right to modify the details, within wide limits under the annexed claims, in order to fit the device for any use to which it may be legitimately put in overcoming shock and promoting an easy movement.

What I claim, is:

1. In a shock absorbing device of the class described, the combination with a casing, of a cone shaped spool, a pair of beveled members, adjoining the spool, rolling means engaging said members and surrounding the spool, said rolling means being actuated horizontally by the spool in its vertical movement up or down to urge the beveled members apart, and a spring acting against the beveled members and tending to press them together, whereby shock in mechanism with which the device is used may be absorbed.

2. In a shock absorber of the class described, the combination with a casing, an element to which it is attached rigidly, a second element, flexible means in the casing and connecting the casing to said second element, so that a shock originating in one element may be absorbed in the flexible means and not be communicated to the other element, said flexible means consisting of a conical member having a stem connected to said second element, bevel pieces whose opposing faces offer a wedge shaped space between them, rolling means in said wedge space and in contact with the conical member, and a spring tensioned against the beveled pieces and acting to urge them together while the conical member in its vertical travel actuates the rolling means in the wedge space to separate the beveled pieces.

3. In a shock absorber of the class described, the combination with a cylindrical casing, an element to which it is attached rigidly, a second element carried on the shock device, flexible means in the casing and connecting the casing to said second element, so that a shock originating in one element may be absorbed in the flexible means and not be communicated to the other element, said flexible means consisting of a double conical spool having a stem connected to said second element, bevel rings surrounding the spool, rolling devices between the rings and around the spool, said devices being forced against the conical sides of the spool in bevel rings by the conical sides of the spool in its movement so as to spread the rings apart, and a spiral spring surrounding the spool and tensioned against the rings and acting to urge the rings into contact with each other.

4. In a shock absorber of the class described, the combination with a casing, of an incline-faced spool, beveled rings surrounds the spool, rolling means around the spool and adapted to be forced by the inclined face of the spool laterally between the beveled rings, a spring surrounding the spool and tensioned against the rings to urge them together, and a piston carried by the lower end of the spool and operating in a fluid or liquid chamber in the lower part of the casing, to assist the regular movement of the shock absorbing devices.

5. In a shock absorber of the class described, the combination with a casing, of an incline-faced spool, bevel rings surrounding the spool, rolling means around the spool and adapted to be forced by the inclined face of the spool laterally between the beveled rings, a spiral spring surrounding the spool and tensioned against the rings to urge the rings together and a piston carried by the lower end of the spool and operating in a fluid or liquid chamber in the casing, said piston having a series of openings, a valve on the piston controlling said openings, said piston having also a by-pass and a valve controlling the latter and adjustable in reference thereto.

6. In a shock absorber of the class described, the combination with a casing, of means adapted to attach it rigidly to one of a pair of elements between which the shock absorber is located to prevent shocks from being communicated from one element to the other, and flexible means in the casing for connecting the casing to the second element of the pair, said flexible means consisting of a spool member having inclined sides, beveled rings whose opposing faces offer a wedge-shaped raceway, rolling devices in said raceway and in contact with the spool, and a spring pressing against the rings and acting to urge them together while the spool in its vertical travel actuates the rolling means in the raceway to separate the rings, said spool resisting against shocks which strain it axially and laterally.

7. In a shock absorber of the class described, the combination with a casing, of means adapted to attach it rigidly to one of a pair of elements between which the shock absorber is interposed to prevent the communication of shocks from one element to the other, flexible means in casing for resiliently connecting the casing to the second element of the pair, said flexible means consisting of a spool member shaped as a double cone, beveled rings that form a raceway between them, rolling devices in the raceway and in contact with the spool, a spring pressing against the rings to urge them together while the spool in its vertical travels actuates the rolling means to separate the rings, said spool resisting against shocks that strain it axially and laterally, and a valve-provided piston carried by the lower end of the spool and operating in an interior fluid chamber in the casing.

8. In a shock absorber of the class described, the combination with a casing, of means for attaching it to one element rigidly, and resilient means for attaching it to another element, so that shocks originating in either element may not be transmitted to the other, said resilient means consisting of a rod member attached to the second element and having a double-conical curved-sided spool section, a spring-pressed raceway of separable bevelled rings in the casing in which rings the spool lies, rolling devices in the raceway on which devices the spool section of the said rod travels to laterally move the rolling devices and open the raceway against spring pressure.

9. In a shock absorber of the class described, the combination with a casing, of means for attaching it rigidly to one element, and resilient means for attaching it to another element, so that shocks in one element may be absorbed without reaching the other, said resilient means consisting of a double-conical curved-sided spool having an extension adapted to be connected to the second element, a pair of beveled rings in which the spool lies, balls between the beveled faces of the rings and in contact with the spool, one ring being stationary and one movable, and a spring tensioned against the movable ring and adapted to be overcome by the movement of the balls under the travel of the spool.

10. In a shock absorber of the class described, the combination with a casing having a fluid or liquid chamber in the lower end thereof, of resilient means for connecting it with other means to prevent the latter from receiving shocks, said resilient means consisting of a double conical spool having an upper extension adapted to be connected with the aforesaid other means, a pair of beveled rings in which the spool lies and which provide a raceway, balls in the raceway and in contact with the spool, a spring tensioned against the rings, and a valve-provided piston attached to the lower end of the spool and working in the fluid or liquid-chamber of the casing, said piston having a series of opening controlled by the automatic opening and closing of the valve.

JOHN V. RICE, Jr.